United States Patent
Sato et al.

(10) Patent No.: US 10,770,700 B2
(45) Date of Patent: Sep. 8, 2020

(54) BATTERY PACK

(71) Applicant: YAZAKI CORPORATION, Tokyo (JP)

(72) Inventors: Katsunori Sato, Shizuoka (JP); Yoshiaki Ichikawa, Shizuoka (JP); Takao Shoji, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 29 days.

(21) Appl. No.: 16/005,651

(22) Filed: Jun. 11, 2018

(65) Prior Publication Data

US 2018/0358588 A1 Dec. 13, 2018

(30) Foreign Application Priority Data

Jun. 12, 2017 (JP) ................................ 2017-114916

(51) Int. Cl.
| | |
|---|---|
| *H01M 2/10* | (2006.01) |
| *H01M 10/42* | (2006.01) |
| *H01M 2/20* | (2006.01) |
| *H01M 2/30* | (2006.01) |
| *H01M 10/48* | (2006.01) |

(52) U.S. Cl.
CPC ....... *H01M 2/1016* (2013.01); *H01M 2/1094* (2013.01); *H01M 2/202* (2013.01); *H01M 2/30* (2013.01); *H01M 10/425* (2013.01); *H01M 10/482* (2013.01)

(58) Field of Classification Search
CPC .. H01M 2/1016; H01M 2/1094; H01M 2/202; H01M 2/30; H01M 10/482
See application file for complete search history.

(56) References Cited

U.S. PATENT DOCUMENTS

2010/0073005 A1* 3/2010 Yano .................... H01M 2/1066
324/427

FOREIGN PATENT DOCUMENTS

| JP | 2010-114025 A | 5/2010 | |
|---|---|---|---|
| JP | 2011-34883 A | 2/2011 | |
| JP | WO 2011/111676 * | 9/2011 | .............. H01M 2/20 |
| JP | 2015-187912 A | 10/2015 | |
| JP | 2015-230208 A | 12/2015 | |
| JP | 2016-18634 A | 2/2016 | |

* cited by examiner

*Primary Examiner* — Helen Oi K Conley
(74) *Attorney, Agent, or Firm* — Kenealy Vaidya LLP

(57) ABSTRACT

A battery pack includes: battery cells arranged such that the positive terminals and the negative terminals are alternately arranged; bus bars electrically connecting the positive terminals and the negative terminals of the adjacent battery cells; an insulating cover attachable to the battery cells and covering the positive terminals and the negative terminals; a monitor substrate in which a monitor circuit is mounted; and detection terminals electrically connected to the monitor substrate and electrically connected to the respective bus bars. The monitor substrate and the detection terminals are disposed integrally to an inner surface of the insulating cover. The detection terminals are electrically connected to the respective bus bars in a state in which the insulating cover is attached to the battery cells.

9 Claims, 5 Drawing Sheets

BATTERY PACK

CROSS-REFERENCES TO RELATED APPLICATIONS

This application is based on and claims priority from Japanese Patent Application No. 2017-114916 filed on Jun. 12, 2017, the entire contents of which are incorporated herein by reference.

FIELD

One or more embodiments of the present invention relate to a battery pack which includes a plurality of battery cells and an insulating cover attached to the battery cells.

BACKGROUND

In the related art, there is known a technology of the battery pack (for example, see JP-A-2010-114025). A battery pack illustrated in FIG. 3 of JP-A-2010-114025 includes a high-voltage detection module device and a battery pack body.

As illustrated in FIG. 1 of JP-A-2010-114025, the high-voltage detection module device includes an insulating frame, a bus bar which is set at a predetermined position of an upper surface of the insulating frame, a flat cable which is connected to the bus bar, and a convex monitoring connector which is connected to the flat cable.

As illustrated in FIGS. 2 and 3 of JP-A-2010-114025, the battery pack body includes a plurality of battery cells which are arranged such that a positive terminal and a negative terminal are alternately arranged, a concave monitoring connector into which the convex monitoring connector is inserted, and a monitor unit to which the concave monitoring connector is connected.

As illustrated in FIG. 3 of JP-A-2010-114025, when the high-voltage detection module device is attached to the battery pack body, the convex monitoring connector of the high-voltage detection module device is inserted into the concave monitoring connector of the monitor unit, and the positive terminals and the negative terminals of the battery cells are electrically connected by the bus bar.

SUMMARY

Incidentally, the battery pack according to the related art is configured such that a bus bar module (for example, the high-voltage detection module device in JP-A-2010-114025) is mounted in upper surfaces of the plurality of arranged battery cells, and an insulating cover is mounted from the upper side of the bus bar module.

There are some parts having both an insulating function and a covering function in the battery pack configured as described above. Therefore, the battery pack is increased in size, and a manufacturing cost is not reduced.

One or more embodiments of the invention have been made in view of the above circumstances, and an object thereof is to provide a battery pack which can be made compact and reduced in manufacturing cost.

In a first aspect of the invention, there is provided a battery pack including: a plurality of battery cells, each of which includes a positive terminal and a negative terminal formed on and protruding from one surface, and the plurality of battery cells being arranged such that the positive terminals and the negative terminals are alternately arranged; a plurality of bus bars, each of which electrically connects the positive terminal and the negative terminal of the adjacent battery cells; an insulating cover which is attachable to the plurality of battery cells and covers the positive terminals and the negative terminals which are connected by the respective bus bars; a monitor substrate in which a monitor circuit is mounted to monitor a state of the plurality of battery cells; and a plurality of detection terminals which are electrically connected to the monitor substrate and electrically connected to the plurality of bus bars, respectively, to detect the state of the battery cell, wherein the monitor substrate and the plurality of detection terminals are disposed integrally to an inner surface of the insulating cover, and wherein the plurality of detection terminals are electrically connected to the plurality of bus bars, respectively, in a state in which the insulating cover is attached to the plurality of battery cells.

According to the first aspect of the invention, the monitor substrate and the detection terminals are disposed integrally to the inner surface of the insulating cover. Therefore, the monitor substrate and the battery cells can be insulated simultaneously by attaching the insulating cover to the plurality of battery cells.

The positive terminal and the negative terminal of the adjacent battery cells are electrically connected to the bus bar in advance. The detection terminal is electrically connected to the bus bar in a state in which the insulating cover is attached to the battery cells. Therefore, the battery cell can be insulated by the insulating cover and the bus bar and the monitor substrate can be electrically connected at the same time.

In a second aspect of the invention, there is provided the battery pack according to the first aspect, further including: a cover which is formed of a conductive metallic material or an insulating resin material, and covers the monitor substrate.

According to the second aspect of the invention, the monitor substrate is sealed by covering the monitor substrate using the cover formed of the conductive metallic material. In addition, the monitor substrate is insulated by covering the monitor substrate using the cover formed of the insulating resin material.

In a third aspect of the invention, there is provided the battery pack according to the first or second aspect, wherein the plurality of detection terminals come into surface contact with the plurality of bus bars, respectively, in a state in which the insulating cover is attached to the plurality of battery cells.

According to the third aspect of the invention, the detection terminal comes into surface contact with the bus bar when the insulating cover is attached to the battery cells.

According to one or more embodiments of the invention, the monitor substrate and the battery cells can be insulated simultaneously, so that a function of insulating the monitor substrate and a function of insulating the battery cell are integrated. Therefore, the battery pack can be made compact and a manufacturing cost thereof can be reduced.

BRIEF DESCRIPTION OF DRAWINGS

FIGS. 1A and 1B are views illustrating a battery pack according to an embodiment of the invention, wherein FIG. 1A is a perspective view of the battery pack and FIG. 1B is a perspective view illustrating the battery pack in a state where an insulating cover thereof is removed (a perspective view of a battery stack);

FIGS. 2A and 2B are views illustrating the insulating cover, wherein FIG. 2A is a perspective view when the insulating cover is viewed from the lower side and FIG. 2B is an enlarged perspective view of a portion indicated by an arrow A in FIG. 2A;

FIGS. 3A and 3B are views illustrating the battery pack, wherein FIG. 3A is a cross-sectional view of the battery pack and FIG. 3B is an enlarged cross-sectional view of a portion indicated by an arrow B in FIG. 3A;

FIGS. 5A and 5B are views illustrating a modification of the detection terminal, wherein FIG. 5A is a perspective view illustrating a second modification of the detection terminal and FIG. 5B is a perspective view illustrating a third modification of the detection terminal.

DETAILED DESCRIPTION

Hereinafter, a battery pack according to an embodiment of the invention will be described with reference to FIGS. 1A to 3B.

Figure 1A:
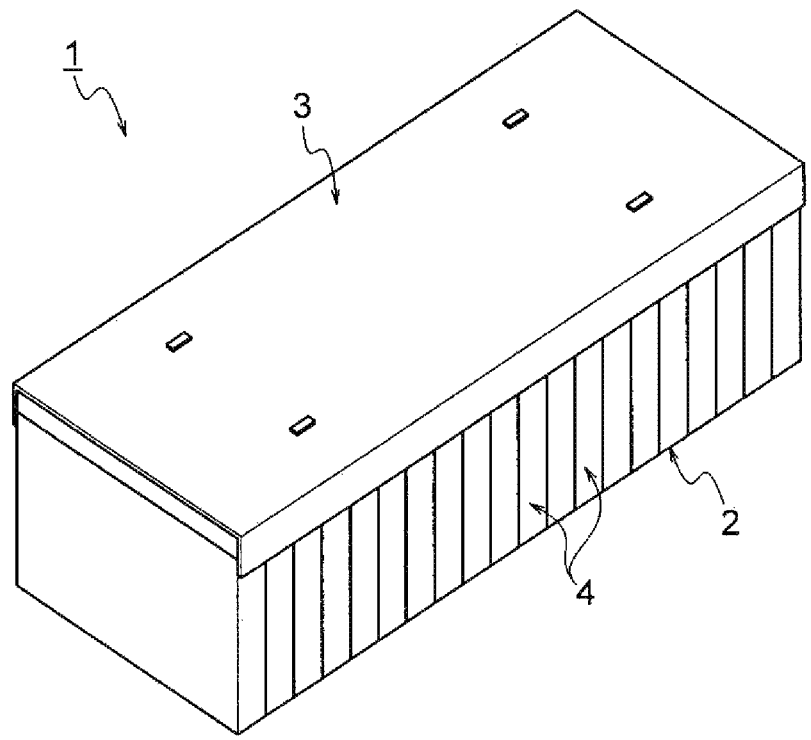
Figure 1B:
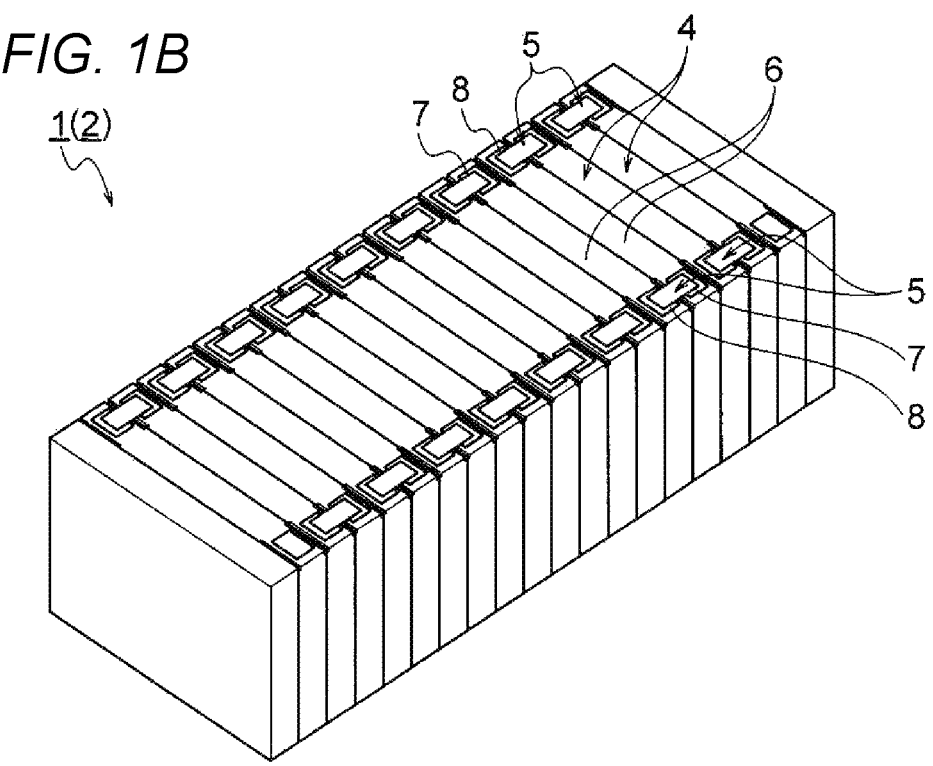
Figure 2A:
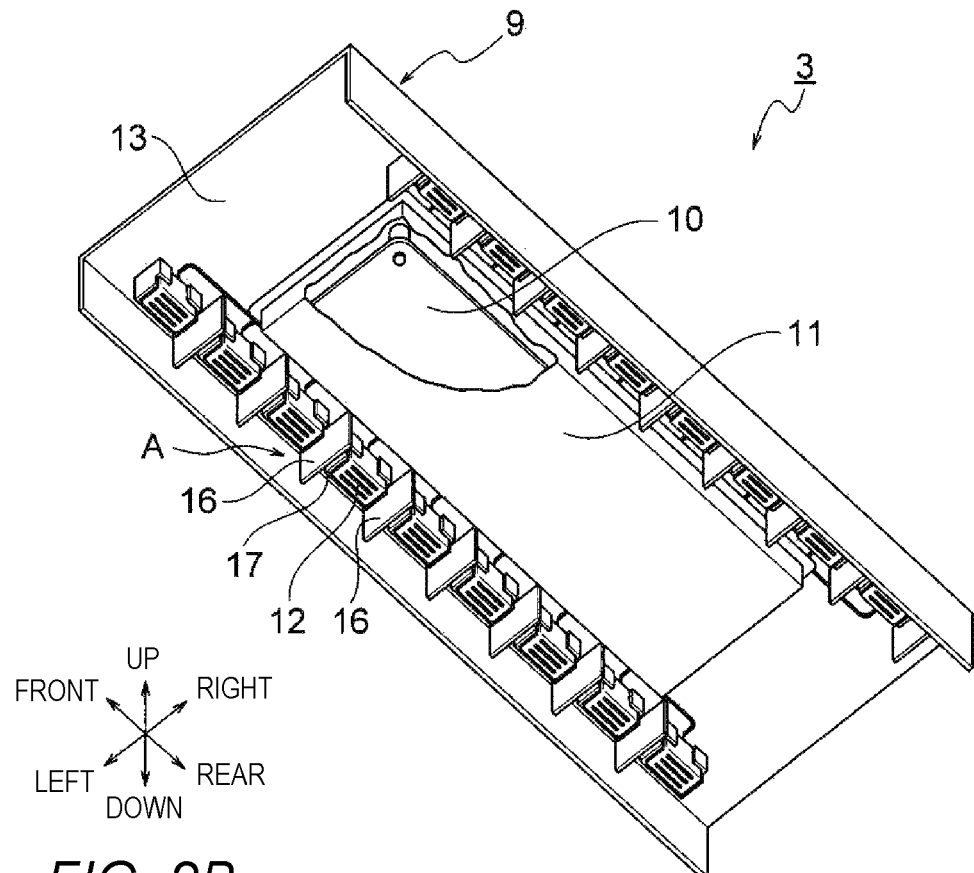
Figure 2B:
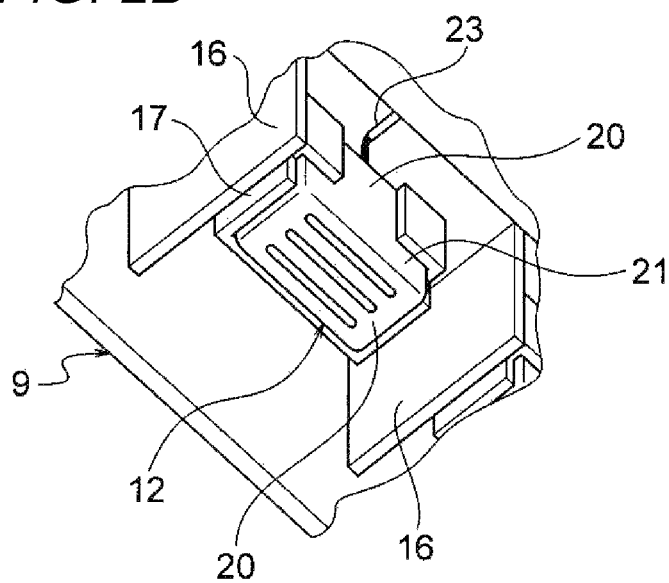
Figure 3A:
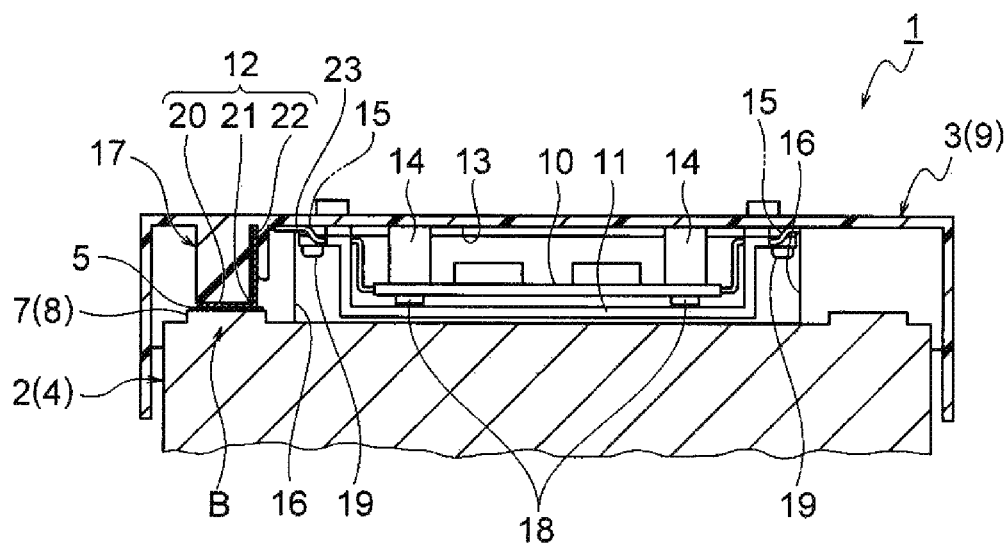
Figure 3B:
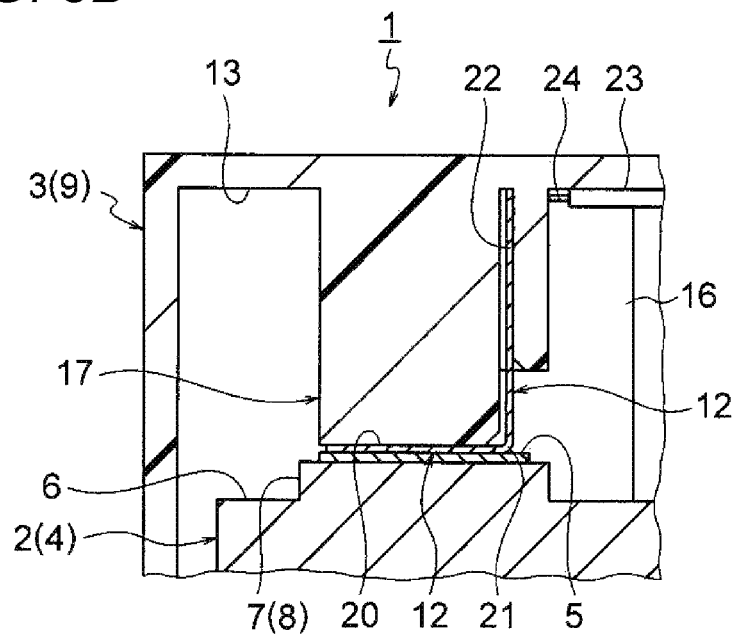

FIGS. 1A and 1B are views illustrating the battery pack according to the embodiment of the invention, wherein FIG. 1A is a perspective view of the battery pack and FIG. 1B is a perspective view illustrating the battery pack in a state where an insulating cover thereof is removed (a perspective view of a battery stack). FIGS. 2A and 2B are views illustrating the insulating cover, wherein FIG. 2A is a perspective view when the insulating cover is viewed from the lower side and FIG. 2B is an enlarged perspective view of a portion indicated by an arrow A in FIG. 2A. FIGS. 3A and 3B are views illustrating the battery pack, wherein FIG. 3A is a cross-sectional view of the battery pack and FIG. 3B is an enlarged cross-sectional view of a portion indicated by an arrow B in FIG. 3A.

Arrows in the drawings indicate directions of up and down, right and left, and front and rear (the respective directions of arrows are exemplary).

In FIGS. 1A and 1B, the reference numeral 1 indicates the battery pack according to the embodiment of the invention. The battery pack 1 is a battery pack which is mounted in a hybrid vehicle or an electric vehicle for example. The battery pack 1 includes a battery stack 2 and an insulating cover 3 which is attached to the battery stack 2. Hereinafter, the components of the battery pack 1 will be described.

First, the battery stack 2 will be described.

The battery pack 2 illustrated in FIGS. 1A and 1B includes a plurality of battery cells 4, a plurality of resin frames (not illustrated), and a plurality of bus bars 5. The resin frame is not illustrated for the sake of simplicity in FIG. 1B, but the battery stack 2 is configured such that the battery cell 4 and the resin frame are alternately disposed.

The battery cell 4 is a chargeable secondary battery, for example, a nickel hydrogen battery and a lithium ion battery. The battery cell 4 includes a positive terminal 7 and a negative terminal 8 which protrude in an upper surface 6 (one end surface).

While not illustrated in the drawing, the resin frame is formed of an insulating resin material. The resin frame includes a main body which is interposed between the battery cells 4, and a lock unit which protrudes in the upper end of the main body. The lock unit is a lock portion which is formed to lock the insulating cover 3 when the insulating cover 3 to be described below is attached to the battery stack 2.

The bus bar 5 illustrated in FIG. 1B is formed of a conductive metallic material, and formed in almost a strip plate shape. The bus bar 5 is formed to electrically connect the positive terminal 7 and the negative terminal 8 of the adjacent battery cells 4. In this embodiment, the bus bar 5 is welded and connected to the positive terminal 7 and the negative terminal 8 (which is an example, and other connection methods may be employed).

Next, the insulating cover 3 will be described.

As illustrated in FIGS. 1A and 1B, the insulating cover 3 is formed to be attached to the battery stack 2. When being attached to the battery stack 2, the insulating cover 3 is formed to cover the positive terminal 7 and the negative terminal 8 which are connected by the bus bar 5.

As illustrated in FIGS. 2A and 2B, the insulating cover 3 includes an insulating cover body 9, a monitor substrate 10, a monitor substrate cover 11, and a detection terminal 12.

The insulating cover body 9 illustrated in FIGS. 1A to 2B is formed of an insulating resin material in a lid shape to cover an upper surface of the battery stack 2. As illustrated in FIGS. 2A to 3B, the insulating cover body 9 includes a monitor substrate fixing portion 14, a cover fixing portion 15, an insulating wall 16, and a detection terminal mounting portion 17 in an inner surface 13.

As illustrated in FIGS. 3A and 3B, the monitor substrate fixing portion 14 is disposed in the center portion of the inner surface 13 of the insulating cover body 9. The monitor substrate fixing portion 14 is formed as a portion in which the monitor substrate 10 to be described below can be fixed with a bolt 18.

As illustrated in FIGS. 3A and 3B, the cover fixing portion 15 is disposed in the center portion of the inner surface 13 of the insulating cover body 9. The cover fixing portion 15 is formed as a portion in which the monitor substrate cover 11 to be described below can be fixed with a bolt 19.

As illustrated in FIGS. 2A to 3B, the insulating walls 16 are disposed on both right and left sides of the inner surface 13 of the insulating cover body 9. The insulating walls 16 are arranged in a front and rear direction with a predetermined gap therebetween. The gap between the insulating walls 16 is formed such that the bus bar 5, and the positive terminal 7 and the negative terminal 8 connected by the bus bar 5 can be interposed between the insulating walls 16. The positive terminal 7 and the negative terminal 8 connected by the bus bar 5 are insulated by being interposed between the insulating walls 16.

As illustrated in FIGS. 2A to 3B, the detection terminal mounting portion 17 is disposed between the insulating walls 16. The detection terminal mounting portions 17 are arranged in the front and rear direction. As illustrated in FIGS. 2A to 3B, the detection terminal mounting portion 17 is formed as a portion in which the detection terminal 12 to be described below is mounted. The detection terminal mounting portion 17 is disposed at a position where the detection terminal 12 mounted in the detection terminal mounting portion 17 can be electrically connected to the bus bar 5 when the insulating cover 3 is attached to the battery stack 2. Specifically, the detection terminal mounting portion 17 is formed such that the detection terminal 12 is disposed immediately above the bus bar 5 when the insulating cover 3 is attached to the battery stack 2.

As illustrated in FIGS. 2A to 3B, the monitor substrate 10 is mounted with a monitor circuit which is used to monitor a state (a voltage, a temperature, etc.) of each of the battery cells 4. As illustrated in FIGS. 2A to 3B, the monitor substrate 10 is fixed to the monitor substrate fixing portion 14. As illustrated in FIGS. 2A to 3B, the monitor substrate 10 is integrally disposed in the inner surface 13 of the insulating cover body 9.

The monitor substrate cover 11 illustrated in FIGS. 2A to 3B is an example of a "cover." The monitor substrate cover 11 is a cover which is formed of an insulating resin material in this embodiment, and covers the monitor substrate 10 for insulation as illustrated in FIGS. 2A to 3B.

The monitor substrate cover 11 may be formed of a conductive metallic material. Since the monitor substrate cover is formed of a conductive metallic material, the monitor substrate cover 11 can electromagnetically shield the monitor substrate 10.

The detection terminal 12 illustrated in FIGS. 2A to 3B is formed by pressing a conductive metal plate. The detection terminal 12 is formed in almost a strip plate shape in this embodiment. As illustrated in FIGS. 2A to 3B, the detection terminal 12 is formed to be mounted in the detection terminal mounting portion 17. As illustrated in FIGS. 2A to 3B, the detection terminal 12 is disposed integrally to the inner surface 13 of the insulating cover body 9. As illustrated in FIGS. 3A and 3B, the detection terminal 12 is disposed at a position where the detection terminal 12 is electrically connected to the bus bar 5 when the insulating cover 3 is attached to the battery stack 2. Specifically, as illustrated in FIGS. 3A and 3B, the detection terminal 12 is disposed immediately above the bus bar 5 when the insulating cover 3 is attached to the battery stack 2.

As illustrated in FIGS. 2A to 3B, the detection terminal 12 includes an electrical contact portion 20, an intermediate portion 21, and a conductor connection portion 22. As illustrated in FIGS. 3A and 3B, the detection terminal 12 is bent at the intermediate portion 21 such that the cross section becomes almost an L shape.

As illustrated in FIGS. 3A and 3B, the electrical contact portion 20 is a portion which is electrically connected to the bus bar 5, and is formed in a flat plate shape. As illustrated in FIGS. 2A to 3B, the electrical contact portion 20 is disposed to be exposed from the lower end of the detection terminal mounting portion 17. As illustrated in FIGS. 3A and 3B, the electrical contact portion 20 can be electrically connected to the bus bar 5 when the insulating cover 3 is attached to the battery stack 2. In this embodiment, as illustrated in FIGS. 3A and 3B, the electrical contact portion 20 is formed to come into surface contact with the bus bar 5 when the insulating cover 3 is attached to the battery stack 2 (which is an example, and other connection methods may be employed).

As illustrated in FIGS. 2A to 3B, the intermediate portion 21 is formed to couple the electrical contact portion 20 and the conductor connection portion 22 in the middle of the detection terminal 12. The intermediate portion 21 is a portion of which the cross section is bent in almost an L shape as illustrated in FIGS. 3A and 3B.

As illustrated in FIGS. 2A to 3B, the conductor connection portion 22 is formed in a plate shape. A conductor 24 of a terminal of an electric wire 23 led out of the monitor substrate 10 is electrically connected to the conductor connection portion 22. In this embodiment, the conductor 24 is connected by welding (which is as an example, and other connection methods may be employed).

Next, a procedure (work) for assembling the battery pack 1 will be described based on the configurations and the structures described above.

In a first step, the battery stack 2 illustrated in FIG. 1B is assembled. The battery stack 2 is assembled by alternately arranging the battery cell 4 and the resin frame (not illustrated). Then, the positive terminals 7 and the negative terminals 8 of the adjacent battery cells 4 are electrically connected by the bus bars 5. Herein, the bus bar 5 is connected to the positive terminal 7 and the negative terminal 8 by welding. With this step, the battery stack 2 illustrated in FIG. 1B is completed.

In a second step, the insulating cover 3 illustrated in FIG. 2A is attached to the battery stack 2 illustrated in FIG. 1B. When the insulating cover 3 is attached to the upper surface of the battery stack 2, the insulating cover 3 is locked by the lock unit of the resin frame (not illustrated).

Herein, as illustrated in FIGS. 2A to 3B, the detection terminal 12 integrally disposed in the inner surface 13 of the insulating cover body 9 is disposed to be located immediately above the bus bar 5 when the insulating cover 3 is attached to the battery stack 2. Therefore, the detection terminal 12 is electrically connected to the bus bar 5 at the time of attachment. Since the detection terminal 12 and the bus bar 5 are electrically connected, the monitor substrate 10 can monitor a state (a voltage, a temperature, etc.) of each battery cell 4 via the detection terminal 12.

With the above steps, as illustrated in FIG. 1A, the battery pack 1 is completed when the insulating cover 3 is completely attached to the battery stack 2.

Figure 4:
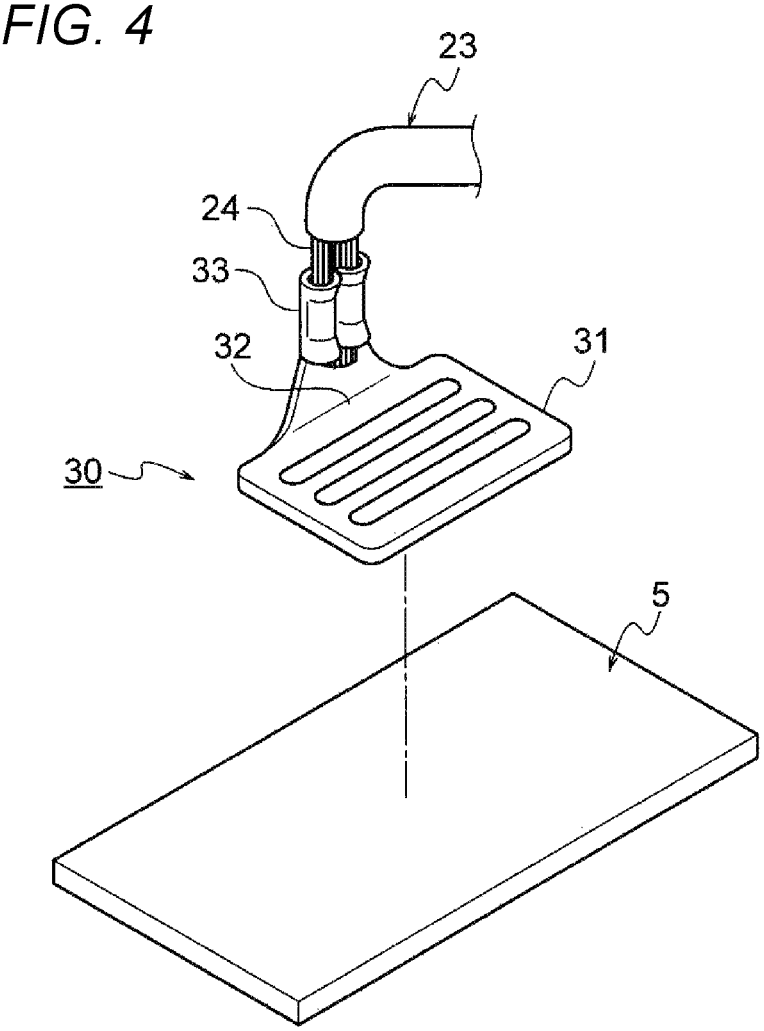
FIG. 4 is a perspective view illustrating a first modification of a detection terminal.
Figure 5A:
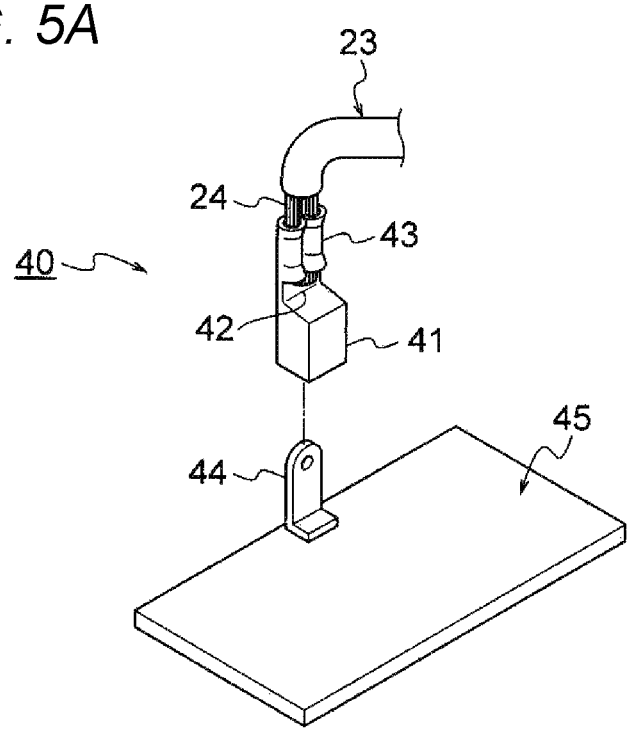
Figure 5B:
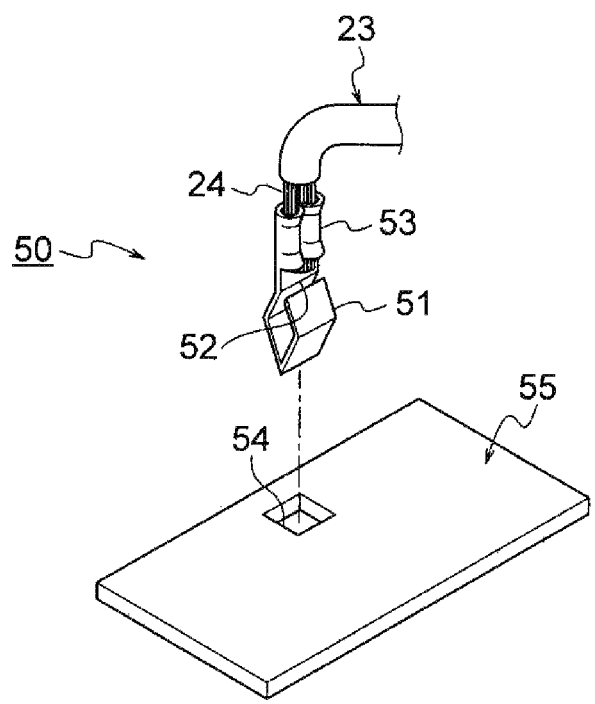

The detection terminal 12 (a constituent member) of the battery pack 1 may be replaced with those of a first modification illustrated in FIG. 4 or second and third modifications illustrated in FIGS. 5A and 5B. Hereinafter, the modifications of the detection terminal will be described with reference to FIGS. 4 to 5B. FIG. 4 is a perspective view illustrating the first modification of the detection terminal. FIGS. 5A and 5B are views illustrating modifications of the detection terminal, wherein FIG. 5A is a perspective view illustrating the second modification of the detection terminal and FIG. 5B is a perspective view illustrating the third modification of the detection terminal.

A detection terminal 30 according to the first modification illustrated in FIG. 4 is formed as a caulking portion in which a conductor connection portion 33 is connected to the conductor 24 of the terminal of the electric wire 23 by caulking.

A detection terminal 40 according to the second modification illustrated in FIG. 5A is formed as a female terminal in which an electrical contact portion 41 is formed in a box shape. The electrical contact portion 41 illustrated in FIG. 5A is formed to insert a tab terminal 44 welded to an upper surface of a bus bar 45 for connection. A conductor connection portion 43 has the same configuration and the same structure as those of the conductor connection portion 33 in the first modification.

A detection terminal 50 according to the third modification illustrated in FIG. 5B is formed as a pin-like terminal in which an electrical contact portion 51 has an outer appearance illustrated in FIG. 5B. The electrical contact portion 51 is formed to be engaged and connected by being inserted to an engagement hole 54 which passes through a bus bar 55. A conductor connection portion 53 has the same configuration and the same structure as those of the conductor connection portion 33 in the first modification.

Next, effects of the battery pack 1 will be described.

Hitherto, the battery pack 1 is configured to insulate the monitor substrate 10 and the battery cell 4 simultaneously as described with reference to FIGS. 1A to 5B. Therefore, the battery pack 1 can be made compact by integrating the function of insulating the monitor substrate 10 and the function of insulating the battery cell 4. Further, a manufacturing cost of the battery pack 1 can be reduced.

According to the battery pack 1, when the insulating cover 3 is attached to the plurality of battery cells 4, the bus bar 5 (45, 55) and the monitor substrate 10 are electrically connected at the same time as the insulation of the battery cell 4. Therefore, the insulation of the battery cell 4, and the electrical connection between the bus bar 5 (45, 55) and the monitor substrate 10 can be performed at once, so that the number of steps in the assembling work of the battery pack 1 can be reduced.

Further, according to the battery pack 1, in a case where an abnormality occurs in the monitor substrate 10, the monitor substrate 10 can also be exchanged by replacing the insulating cover 3. Therefore, the monitor substrate 10 can be simply exchanged.

Further, it is a matter of course that various modifications can be made within a scope not departing from the scope of the invention.

The invention claimed is:

1. A battery pack comprising:
a plurality of battery cells, each of which comprises a positive terminal and a negative terminal formed on and protruding from one surface, and the plurality of battery cells being arranged such that the positive terminals and the negative terminals are alternately arranged;
a plurality of bus bars, each of which electrically connects the positive terminal and the negative terminal of the adjacent battery cells;
an insulating cover which is attachable to the plurality of battery cells and covers the positive terminals and the negative terminals which are connected by the respective bus bars;
a monitor substrate in which a monitor circuit is mounted to monitor a state of the plurality of battery cells; and
a plurality of detection terminals which are electrically connected to the monitor substrate and electrically connected to the plurality of bus bars, respectively, to detect the state of the battery cell,
wherein the monitor substrate and the plurality of detection terminals are disposed integrally to an inner surface of the insulating cover,
wherein the plurality of detection terminals are electrically connected to the plurality of bus bars, respectively, in a state in which the insulating cover is attached to the plurality of battery cells,
wherein the insulating cover comprises a detection terminal mounting portion at which the plurality of detection terminals are mounted,
wherein the detection terminal mounting portion is formed such that the detection terminals are disposed immediately above the plurality of bus bars in the state in which the insulating cover is attached to the plurality of battery cells, and
wherein the insulating cover further includes a plurality of insulating walls extending from the inner surface of the insulating cover toward the battery cells, and each of the insulating walls extends between a respective pair of the detection terminals and between a respective pair of the bus bars.

2. The battery pack according to claim 1, further comprising:
a monitor substrate cover which is formed of a conductive metallic material or an insulating resin material, and covers the monitor substrate.

3. The battery pack according to claim 1,
wherein the plurality of detection terminals come into surface contact with the plurality of bus bars, respectively, in a state in which the insulating cover is attached to the plurality of battery cells.

4. A battery pack comprising:
a plurality of battery cells, each of which comprises a positive terminal and a negative terminal formed on and protruding from one surface, and the plurality of battery cells being arranged such that the positive terminals and the negative terminals are alternately arranged;
a plurality of bus bars, each of which electrically connects the positive terminal and the negative terminal of the adjacent battery cells;
an insulating cover which is attachable to the plurality of battery cells and covers the positive terminals and the negative terminals which are connected by the respective bus bars;
a monitor substrate in which a monitor circuit is mounted to monitor a state of the plurality of battery cells; and
a plurality of detection terminals which are electrically connected to the monitor substrate and electrically connected to the plurality of bus bars, respectively, to detect the state of the battery cell,
wherein the monitor substrate and the plurality of detection terminals are disposed integrally to an inner surface of the insulating cover,
wherein the plurality of detection terminals are electrically connected to the plurality of bus bars, respectively, in a state in which the insulating cover is attached to the plurality of battery cells,
wherein the insulating cover comprises a detection terminal mounting portion at which the plurality of detection terminals are mounted,
wherein the detection terminal mounting portion is formed such that the detection terminals are disposed immediately above the plurality of bus bars in the state in which the insulating cover is attached to the plurality of battery cells,
wherein the insulating cover includes a fixing portion that extends from the inner surface and toward the battery cells, and
wherein the monitor substrate is mounted on the fixing portion and spaced away from the inner surface of the insulating cover.

5. A battery pack comprising:
a plurality of battery cells, each of which comprises a positive terminal and a negative terminal formed on and protruding from one surface, and the plurality of battery cells being arranged such that the positive terminals and the negative terminals are alternately arranged;
a plurality of bus bars, each of which electrically connects the positive terminal and the negative terminal of the adjacent battery cells;
an insulating cover which is attachable to the plurality of battery cells and covers the positive terminals and the negative terminals which are connected by the respective bus bars;
a monitor substrate in which a monitor circuit is mounted to monitor a state of the plurality of battery cells; and
a plurality of detection terminals which are electrically connected to the monitor substrate and electrically connected to the plurality of bus bars, respectively, to detect the state of the battery cell,
wherein the monitor substrate and the plurality of detection terminals are disposed integrally to an inner surface of the insulating cover,
wherein the plurality of detection terminals are electrically connected to the plurality of bus bars, respectively, in a state in which the insulating cover is attached to the plurality of battery cells, wherein the insulating cover comprises a detection terminal mounting portion at which the plurality of detection terminals are mounted, wherein the detection terminal mounting portion is formed such that the detection terminals are disposed immediately above the plurality of bus bars in the state in which the insulating cover is attached to the plurality of battery cells, wherein the battery pack further comprises a monitor substrate cover which is formed of a conductive metallic material or an insulating resin material, and covers the monitor substrate, wherein the monitor substrate cover is located between the battery cells and the monitor substrate, and wherein the monitor substrate is located between and spaced away from each of the monitor substrate cover and inner surface of the insulating cover.

6. The battery pack according to claim 2,
wherein the positive terminals, the negative terminals, and the detection terminals are located outside of the monitor substrate cover.

7. The battery pack according to claim 1,
wherein the monitor substrate and the plurality of detection terminals are connected to an inner surface of the insulating cover such that the monitor substrate and the plurality of detection terminals are integrated with the insulating cover.

8. The battery pack according to claim 1,
wherein the monitor substrate is positioned between the insulating cover and each of the plurality of bus bars in an overlapped manner when the insulating cover is attached to the plurality of battery cells.

9. The battery pack according to claim 1,
wherein the insulating cover covers the monitor substrate and the detection terminal from above when the insulating cover is attached to the plurality of battery cells.

* * * * *